(12) United States Patent
Krueger et al.

(10) Patent No.: US 9,139,112 B2
(45) Date of Patent: Sep. 22, 2015

(54) ADJUSTMENT FITTING

(75) Inventors: Frieder Krueger, Coburg (DE); André Blinzler, Grub am Forst (DE); Stephanie Hartleb, Weidhausen (DE); Juergen Siller, Roedental (DE); Volker Moeller, Coburg (DE); Michael Zellmann, Bischberg (DE); Matthias Weiss, Roedental (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 12/966,949

(22) Filed: Dec. 13, 2010

(65) Prior Publication Data

US 2011/0140494 A1 Jun. 16, 2011

Related U.S. Application Data

(63) Continuation of application No. PCT/EP2009/004088, filed on Jun. 6, 2009.

(30) Foreign Application Priority Data

Jun. 13, 2008 (DE) .......................... 10 2008 028 102
Jun. 13, 2008 (DE) .......................... 10 2008 028 103

(51) Int. Cl.
*B60N 2/225* (2006.01)

(52) U.S. Cl.
CPC .................... *B60N 2/2252* (2013.01)

(58) Field of Classification Search
USPC ........................................................ 297/362
See application file for complete search history.

(56) References Cited

U.S. PATENT DOCUMENTS 4,322,112 A 3/1982 Berghaus et al.
4,407,544 A 10/1983 Bähring
(Continued)

FOREIGN PATENT DOCUMENTS

| CN | 102046414 B | 6/2013 |
|---|---|---|
| DE | 28 34 529 A1 | 2/1980 |

(Continued)

OTHER PUBLICATIONS

Japanese Notification of Reasons for Refusal for Japanese Application No. 2011-512879 dated Feb. 19, 2013—English translation.

*Primary Examiner* — Sarah B McPartlin
(74) *Attorney, Agent, or Firm* — Muncy, Geissler, Olds & Lowe, P.C.

(57) ABSTRACT

An adjustment fitting, in particular for a vehicle seat, comprising a first fitting part and a second fitting part that can be rotationally adjusted relative to the first part about an axis of rotation. An external gear, which has internal teeth and into which an internal gear that is associated with the second fitting part and has external teeth is inserted eccentrically to the axis of rotation like an eccentric gear, is associated with the first fitting part. The internal gear forms an eccentric receiving space towards the axis of rotation. The adjustment fitting further comprises an eccentric member that is rotatably inserted into the eccentric receiving space, and a drive shaft for driving the eccentric member. The external gear is designed as a ring gear that has a bottom and an external wall which axially extends beyond the internal teeth. Furthermore, a holding element is provided which can be axially slid against the internal gear in the external wall, is mounted on the external wall, and secures the internal gear against the bottom of the ring gear. The holding element allows the axial tolerance between the internal gear and the external gear to be adjusted.

19 Claims, 3 Drawing Sheets

(56) References Cited

U.S. PATENT DOCUMENTS

| | | |
|---|---|---|
| 7,278,689 B2 | 10/2007 | Guillouët |
| 7,384,101 B2 | 6/2008 | Kawashima et al. |
| 2006/0084547 A1 | 4/2006 | Dill et al. |
| 2011/0140494 A1 | 6/2011 | Krueger et al. |

FOREIGN PATENT DOCUMENTS

| | | |
|---|---|---|
| DE | 29 21 588 | 12/1980 |
| DE | 31 30 315 A1 | 2/1983 |
| DE | 100 21 403 A1 | 11/2001 |
| DE | 101 05 282 A1 | 8/2002 |
| DE | 10 2007 035 138 A1 | 4/2008 |
| EP | 1 676 503 A1 | 7/2006 |
| EP | 1 647 438 A2 | 4/2009 |
| FR | 2 432 951 A1 | 3/1980 |
| FR | 2 510 374 A1 | 2/1983 |
| JP | H 09-182642 A | 7/1997 |
| JP | 2003-235667 A | 8/2003 |
| JP | 2006-204891 A | 8/2006 |
| JP | 2007-144121 A | 6/2007 |
| JP | 2011-522645 A | 8/2011 |
| KR | 10-2011-0028509 A | 3/2011 |
| RU | 2 462 375 C1 | 9/2012 |
| WO | WO 01/83259 A1 | 11/2001 |
| WO | WO 2009/149876 | 12/2009 |

ADJUSTMENT FITTING

This nonprovisional application is a continuation of International Application No. PCT/EP2009/004088, which was filed on Jun. 6, 2009, and which claims priority to German Patent Application Nos. DE 10 2008 028 102.6, which was filed in Germany on Jun. 13, 2008, and to DE 10 2008 028 103.4, which was filed in Germany on Jun. 13, 2008; and which are herein incorporated by reference.

BACKGROUND OF THE INVENTION

1. Field of the Invention

The invention relates to an adjustment fitting, in particular for a motor vehicle seat, having a first fitting part, having a second fitting part that is rotationally adjustable relative to the first fitting part about an axis of rotation, wherein the first fitting part has associated with it an outer wheel with internal teeth, in which wheel is inserted eccentrically to the axis of rotation, in the manner of a wobble mechanism, an inner wheel with external teeth that is associated with the second fitting part, and wherein the inner wheel forms a receiving space that is eccentric to the axis of rotation, having an eccentric cam rotatably inserted in the eccentric receiving space, and having a drive shaft for driving the eccentric cam.

2. Description of the Background Art

An adjustment fitting of this nature is known, for example, from DE 100 21 403 C2, DE 31 30 315 C2 and DE 28 34 529 C2, which corresponds to U.S. Pat. No. 4,322,112. In these fittings, the first fitting part and the second fitting part are connected in the manner of a wobble mechanism, wherein the inner wheel rolls with its external teeth along the internal teeth of the outer wheel with a wobbling motion when the eccentric cam is driven. The number of teeth in the external teeth is smaller than the number of teeth in the internal teeth. One full rotation of the eccentric cam results in a rotation of the inner wheel relative to the outer wheel by the difference in tooth count. An adjustment fitting with wobble mechanism has become established in the automotive industry for adjusting the backrest relative to the seat base of a motor vehicle seat. A wobble mechanism can be implemented with relatively few mechanical parts, and permits flat construction together with a transmission ratio desirable for adjustment.

In the final assembled state, the fitting parts, or the inner and outer wheel of such an adjustment fitting, are held together in the axial direction. An extremely wide variety of retaining components are known from the prior art for this purpose. If the axial play between the fitting parts is too great, the result is undesirable rattling noises, which the vehicle occupant may potentially find worrisome, or at the very least perceive as unpleasant. On the other hand, if the axial play between the fitting parts is too small, an unnecessarily high frictional force has to be overcome in order to adjust the fitting.

Known from the aforementioned DE 100 21 403 C2 for holding the two fitting parts together axially is a retention ring overlapping the two fitting parts that is attached in a rotationally fixed manner to at least one of the fitting parts by means of a polygonal interlock.

According to DE 10 105 282 B4, the fitting parts of an adjustment fitting are held together axially by a retaining ring, wherein a fitting part is pressed into the retaining ring. This is intended to permit easier assembly. It is additionally proposed therein to design the retaining ring with an internal step, with the fitting part being pressed in up to said step. The axial play of the fitting can be adjusted by means of the step.

From DE 31 30 315 C2, it is known to use a plate washer, which is permanently attached to one fitting part, for axially holding together the two fitting parts of an adjustment fitting. In this solution, the edge of the washer constitutes internal teeth that mesh with overhanging external teeth of the inner wheel. To hold the fitting parts together axially, the plate washer is interlocked with a retaining element that is pressed into slots in the other fitting part and is attached to this fitting part in a position with no play.

Finally, DE 28 34 529 C2 discloses a bearing plate holding the fitting parts of an adjustment fitting together axially, which has lateral bent portions that laterally overlap the two fitting parts. During assembly, the fitting parts are pressed together with no play, and the outer fitting part is permanently attached to the lateral bent portions in this position.

SUMMARY OF THE INVENTION

It is therefore an object of the invention is to provide an adjustment fitting of the aforementioned type which permits easy adjustment of the axial play between the outer wheel and the inner wheel.

According to an embodiment, provision is made for the outer wheel to be designed as a ring gear with a floor and with an outer wall that is extended in the axial direction past the internal teeth, and for a retaining element to be provided which can be moved axially in the outer wall toward the inner wheel, and which is attached to the outer wall and supports the inner wheel against the floor of the ring gear.

During assembly, the inner wheel is pushed axially into the ring gear until the floor is reached, and the retaining element is then guided into the interior of the ring gear after it, so that the inner wheel is supported between the floor and the retaining element. Because of the axial displaceability of the retaining element, the axial play of the inner wheel with respect to the outer wheel can be adjusted to zero play. Once the desired position of the retaining element relative to the floor of the outer wheel has been reached, the retaining element is secured to the outer wall. In particular, this can be accomplished by means of a suitable welding technique. In advantageous manner, the securing of the retaining element in the outer wheel is accomplished by means of laser welding. Naturally, fastening by means of adhesives or soldering is also possible. The joining of the retaining element to the outer wall of the outer wheel can be carried out at discrete points or circumferentially.

In this design, the setting of the desired position of the retaining element relative to the floor of the outer wheel can be controlled either by force or by distance. In the case of a setting controlled by force, manufacturing tolerances in the axial height of the inner wheel are compensated. On the other hand, distance-controlled establishment of the desired position allows for variants having alterable strength through variation of the axial thickness of the inner wheel with otherwise identical components. For example, if the thickness of the inner wheel is increased in the case of distance-controlled establishment of the position of the retaining element, this results in an adjustment fitting with increased strength.

It is not necessary for the floor to be designed to have complete area coverage. In principle, it is sufficient to design the floor as a support for the inner ring. A suitably designed edge or partial surface is sufficient for this purpose. Preferably, however, the floor essentially closes off the interior space of the ring gear. In this way, the ring gear can simultaneously form an outer boundary of the adjustment fitting. The interior space, and thus the wobble mechanism, is protected from dirt and the like.

Nor is it necessary to the invention that the axial width of the internal teeth match the axial width of the external teeth. For example, the entire inner wheel can have a reduced thickness as compared to the width of the external teeth and can be supported against the floor past the external teeth by means of angled sections of the retaining element. In contrast, it is also possible for the external teeth to have an increased axial width as compared to the internal teeth, and for the inner wheel to be supported on the retaining element by means of the radially projecting external teeth. In this design, it is possible in particular for the external teeth to be located on a sort of flange by means of which the inner wheel is supported against the retaining element. The support of the inner wheel on the retaining element by means of the external teeth represents an advantageous variant in that the retaining element can then be implemented relatively simply.

In an embodiment of the adjustment fitting, the inner wheel includes an inner wall that is extended in the axial direction past the external teeth and that passes through the retaining element in the axial direction, wherein the inner wheel is associated with the second fitting part via the inner wall. In this variant, when the fitting is in the assembled state the extended inner wall projects past the retaining element in the axial direction, so that it can easily be attached to the second fitting part or to a suitable adapter for attachment to the vehicle seat. It is additionally advantageous for this purpose if the inner wall is extended further in the axial direction, and projects past the outer wall. In this case, simplified attachment to the projecting inner wall is provided. Again, the attachment to the second fitting part or an adapter can be accomplished by adhesive bonding, welding, or soldering. The technique of laser welding is used by preference here, as well.

For a variant that is sturdy and has enhanced crash-resistance, both the outer wall of the outer wheel and the inner wall of the inner wheel are circumferential in design, with an outside edge of the retaining element that is complementary to the outer wall being inserted in the outer wall, where it is permanently attached thereto circumferentially. Separation of such a connection in the event that a strong force is applied to the fitting parts is virtually impossible. The inner wheel is securely supported or guided between the floor of the outer wheel and the retaining element attached to the outer wall.

There are in principle no restrictions regarding the outer contour of the outer wall and inner wall. Both the outer and inner walls can be axially extended in a prismatic manner to form respective hypothetical or actual base surfaces. In particular, polygonal circumferential contours are also possible.

In an embodiment, the outer wall of the ring gear and the inner wall of the inner wheel are each designed as a cylinder wall. The rotationally symmetrical design of the components permits simplified manufacture. In addition, it is not necessary to ensure a specific rotational position of the components relative to one another when joining them.

In useful fashion, the retaining element is designed as a retaining ring or retaining washer that surrounds the inner wheel or its external teeth at least at the edge. As a result of the rotational symmetry, this results in a secure and stable support of the inner wheel in the outer wheel.

In useful fashion, a central elongated collar is formed on the floor of the ring gear, so that the eccentric receiving space is formed between the elongated collar and the inner wheel. The drive shaft for the adjustment fitting, for example, is securely guided in such an elongated collar. On the other hand, such an elongated collar offers the possibility of providing a plain bushing for supporting the eccentric cam.

The eccentric cam in the eccentric receiving space is supported between an inner plain bushing and an outer plain bushing in this design. Such support by means of plain bushings reduces the friction of the rotating eccentric cam with regard to the outer and inner wheels.

An eccentric cam providing a rigid or variable overall eccentricity can be placed in the eccentric receiving space. Various designs are known from the prior art for forming a variable overall eccentricity, in particular. In an especially advantageous embodiment, two mutually rotatable eccentric cam parts forming a variable overall eccentricity are placed in the receiving space and are preloaded against one another to form a maximum overall eccentricity, wherein, furthermore, a carrier that is attached to the drive shaft in a rotationally fixed manner is provided which, when driven, acts on the eccentric cam parts in opposition to the preloading. When the drive shaft is not actuated, the eccentric cam parts are preloaded to the maximum overall eccentricity. In this position, the eccentric cam presses the inner wheel against the outer wheel essentially free of play, so that undesired motion of the two fitting parts relative to one another is hindered. When the drive shaft is moved, the eccentric cam parts are rotated in opposition to the preloading, by which means the overall eccentricity is reduced. Play arises between the inner wheel and outer wheel, so that adjustment of the fitting parts relative to one another is possible.

As already mentioned, in a preferred embodiment the retaining element is welded to the outer wall of the ring gear, with the method of laser welding preferably being used. This can be done by means of a circumferential fillet weld, for example. In particular, a connection by means of what is called a "square butt weld," which is produced by laser welding, is present. It is likewise preferable for the ring gear itself to be attached to the first fitting part by laser welding.

In useful fashion, a continuous bearing journal is provided for supporting the components of the adjustment fitting, on which bearing journal the outer wheel is supported, in particular by means of the aforementioned central elongated collar.

The first fitting part, in particular the ring gear, can be attached, in particular welded, to a backrest adapter, and for the second fitting part, in particular the inner wheel, to be attached, in particular welded, to a seat adapter. Since the adjustment fitting as such has no specific components for a particular vehicle seat, it is very versatile in its use. The adjustment fitting can be used for vehicle seats of different model variants by attaching a seat adapter or backrest adapter. In the configurations shown, the inner wheel remains fixed to the seat, while the outer wheel, including the drive shaft, wobbles during adjustment. The attached seatback moves in the same direction as the drive shaft.

Heretofore, the outer wheel and inner wheel of an adjustment fitting equipped with a wobble mechanism have been implemented as precision stampings that are appropriately formed. Inner and outer wheels fabricated in this manner have an approximately constant material thickness at all points, corresponding essentially to the original sheet thickness. However, a constant material thickness is not suitable for the actual loads. Such fabrication also does not permit precisely toleranced positioning of different geometries on the component, as for example the location of an elongated wall relative to teeth.

However, the cited disadvantages of the prior art manufacturing methods for producing an outer or inner wheel for a wobble mechanism can be overcome if the inner or outer wheel in question is fabricated as a cold extrusion part. Extrusion is a process of massive forming that produces both hollow and solid bodies in a single-stage or multi-stage fabrication process. In principle, in this process the material being processed, in particular metal, is caused to flow under the influence of high pressure. In this process, a die presses the blank workpiece through a tool opening of reduced cross-section, a female mold, that imparts shape. The forming itself generally takes place at room temperature, so that the process is referred to as cold extrusion. In this way, high dimensional accuracy and high surface quality are achieved.

The advantage of using cold extrusion for fabricating the inner wheel and/or the outer wheel for an adjustment fitting lies in the possibility of strength-optimized designs, which may provide weight advantages under some circumstances. In addition, cost advantages can be achieved through savings in material. Moreover, tighter tolerances in the teeth and in coaxiality can be achieved through the use of cold extrusion, improving the homogeneity of actuation of the adjustment fitting. Since an adjustment fitting is a mass-produced part, cost advantages are achieved by the means that only one tool is required for fabrication.

For the aforementioned inner wheel with elongated inner wall, cold extrusion permits, in particular, simplified creation of a geometry in which the external teeth are covered by a circumferential ring. By this means, the teeth are circumferentially bonded, so that strength is increased for the same assembled volume. A corresponding geometry cannot be achieved with other cold forming processes. At most, machining comes into consideration.

For an outer wheel, which in the present case is implemented as a ring gear, the use of cold extrusion allows reinforcement of the material in especially stressed regions. This can be provided in the area of the inner elongated collar or in the vicinity of the teeth, for example.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
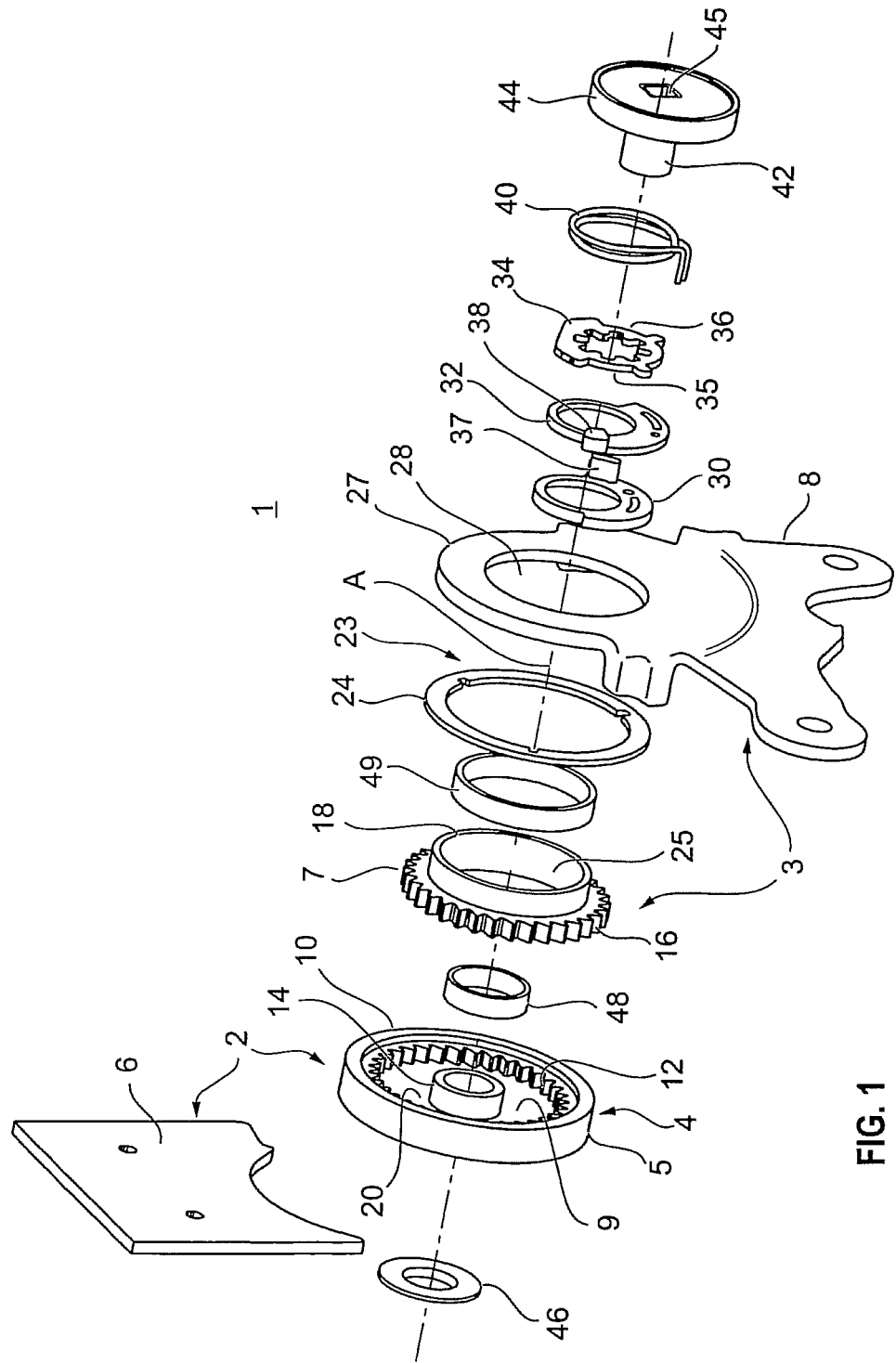
FIG. 1 is an exploded view of an adjustment fitting for a motor vehicle seat, wherein the outer wheel is designed as a ring gear in which the inner wheel is supported by means of a retaining element.

FIG. 1 shows an exploded view of an adjustment fitting 1 for a motor vehicle seat. The adjustment fitting 1 here includes a first fitting part 2 and a second fitting part 3, which are rotationally adjustable relative to one another about an axis of rotation A. The first fitting part 2 includes an outer wheel 4, to which is attached, in particular by welding, a suitable backrest adapter 6 for later installation on a seat backrest. The second fitting part 3 includes an inner wheel 7 and a seat adapter 8 connected thereto for attachment to a seat base.

The outer wheel 4 is designed as a ring gear 5 with a floor 9 and a circumferential, cylindrical outer wall 10. Provided on the inside of the outer wall 10 are axially recessed internal teeth 12. The outer wall 10 is extended in the axial direction beyond the internal teeth 12. Also attached in the interior of the ring gear 5 is an elongated collar 14, which surrounds a central bore. Into the ring gear 5 is placed the inner wheel 7, which comprises circumferential external teeth 16 and a cylindrical inner wall 18 that is elongated in the axial direction beyond the external teeth 16.

To assemble the adjustment fitting 1, the inner wheel 7 is placed in the interior space 20 of the ring gear 4. Since the outside diameter of the inner wheel 7 has a reduced diameter as compared to the inside diameter 12 of the ring gear 4, the latter rotates in a wobbling manner with its external teeth 16 rolling on the internal teeth 12 in the ring gear 5. The number of teeth in the external teeth 16 is reduced as compared to the number of teeth in the internal teeth 12, so that in one full circuit the inner wheel 7 rotates relative to the ring gear 5 by the difference in tooth count.

The inner wheel 7 is inserted axially into the ring gear 5 down to the floor 9. A retaining element 23, which is designed as a retaining ring 24, is then guided into the interior space 20 of the ring gear 5 following the inner wheel 7, during which process it encloses the inner wall 18 of the inner wheel 7. The retaining ring 24 has a diameter that is slightly reduced relative to the inside diameter of the outer wall 10. Its inside diameter permits the wobbling motion of the enclosed inner wall 18 of the inserted inner wheel 7. The external teeth 16 of the inner wheel 7 are located on a circumferential flange by which the inner wheel 7 is supported against the retaining ring 24.

The retaining ring 24 is moved toward the floor 9 of the ring gear 5 until a defined axial play of the inner wheel 7 is established. This can take place under the control of either force or distance. In a force-controlled insertion, manufacturing tolerances in the axial width of the external teeth 16 are compensated. At the desired end position, the retaining ring 24 is circumferentially welded to the inner side of the outer wall 10.

As a result of the inner wheel 7 inserted into the ring gear 5, an eccentric receiving space to accommodate a driving eccentric cam is formed between the elongated collar 7 and the inner wall 18.

The seat adapter 8 includes an outer ring 27, which overlaps the inner wall 18 of the inner wheel 7 via a central opening 28. In the assembled state, the inner wall 18 is permanently welded to the outer ring 27 of the seat adapter 8.

A first eccentric cam part 30 and a second eccentric cam part 32 are placed in the eccentric receiving space 25 to form a variable overall eccentricity. These two eccentric cam parts 30, 32, which together form the eccentric cam, are rotated relative to one another by means of a carrier plate 34 placed thereon, by which means their overall eccentricity is varied. To this end, the carrier plate 34 has lateral recesses 35, 36 in which the carrier projections 37, 38 of the first and second eccentric cam parts 30, 32 engage. The eccentric cam parts 30, 32 are preloaded by means of a spring element 40 to form a maximum overall eccentricity, wherein the inner wheel 7 is pressed against the outer wheel 4 without play in this position.

Provided for driving the adjustment fitting 1 is a continuous bearing journal 42, which includes an eccentric cover 44 that laterally engages the inner wall 18. A square opening 45 is introduced into the cover 44 for driving. The bearing journal 42 is joined to the carrier plate 34 in a rotationally fixed manner. To retain the bearing journal 42, a retaining ring 46 is provided on the opposite side.

An inner plain bushing 48 and an outer plain bushing 49 are provided in order to reduce the friction of the eccentric cam parts 30, 32 on the elongated collar 14 and on the inner wall 18. Here, the inner plain bushing 48 is placed on the elongated collar 14. The outer plain bushing 49 is placed in the inner wall 18.

When the bearing journal 42 is actuated, the two eccentric cam parts 30, 32 are moved in opposition to the spring force by the carrier plate 34, reducing the overall eccentricity. This results in play between the inner wheel 7 and the ring gear 5, so that the eccentric cam can be rotated with a wobbling rolling of the inner wheel 7 in the ring gear 5. The fitting parts 2, 3 are displaced relative to one another about the axis of rotation A.

Figure 2:
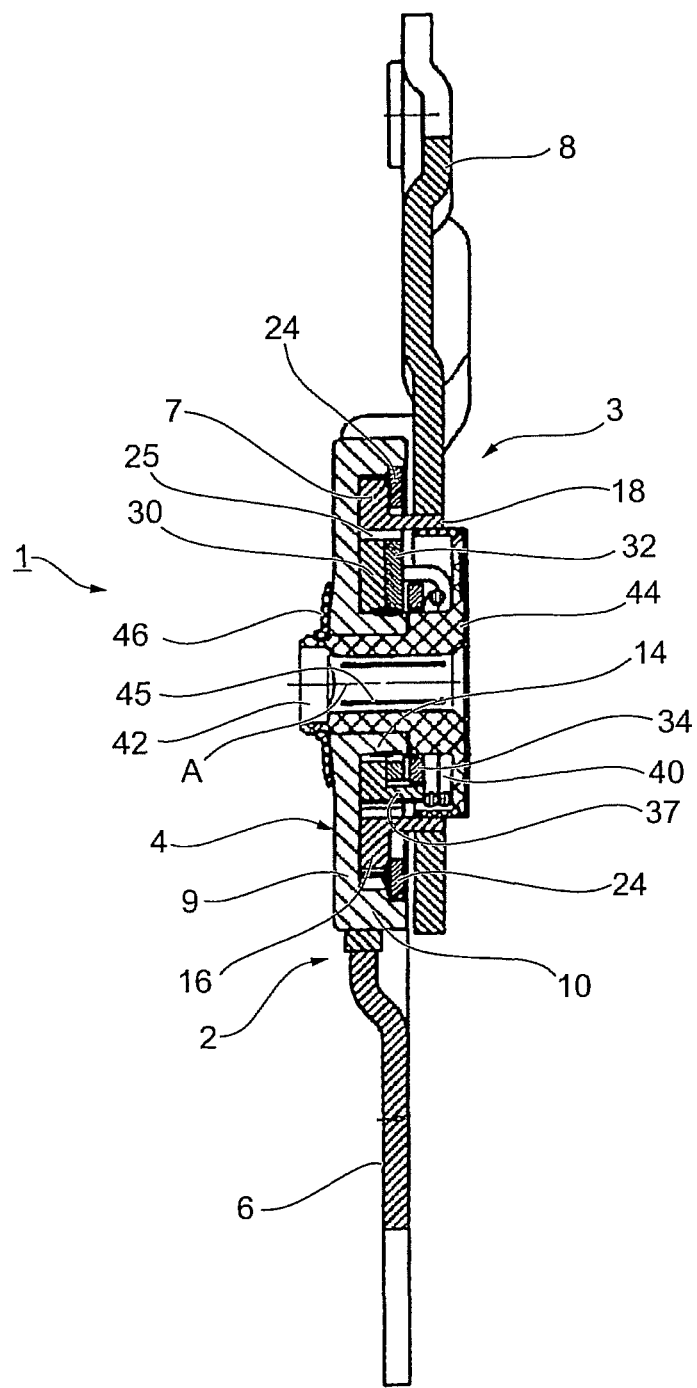
FIG. 2 shows the adjustment fitting from FIG. 1 in a cross-sectional view.

FIG. 2 shows the adjustment fitting 1 from FIG. 1 in cross-section. Evident are the seat adapter 8, which is attached to the inner wheel 7, and the backrest adapter 6, which is rigidly attached to the ring gear 5.

The inner wheel 7 is placed inside the outer wall 10 of the ring gear 4 and is supported between its floor 9 and the retaining ring 24. In this design, the external teeth 16 are supported axially against the retaining ring 24. The axial play of the inner wheel 7 with respect to the ring gear 5 is set by the axial positioning of the retaining ring 24. The retaining ring 24 is welded to the outer wall 10 of the ring gear 5 in the adjusted position. The seat adapter 8 is welded to the outer wall 18 of the inner wheel 7 that is extended in the axial direction beyond the external teeth 16.

The two eccentric cam parts 30 and 32 are placed as an eccentric cam in the eccentric receiving space 25 formed between the elongated collar 14 and the inner wall 18. These eccentric cam parts are preloaded by means of the spring element 40 to form a maximum overall eccentricity. Visible in the cross-section shown is the carrier plate 34, which works together with the carrier projection 37 of the first eccentric cam part 30.

The ring gear 5 is supported on the continuous bearing journal 42 by means of the elongated collar 14. It is evident that the bearing journal 42 is secured on the side of the ring gear 4 by means of the retaining ring 46. On the opposite side, the bearing journal 42 transitions to the cover 44, whose laterally down-turned walls extend into the inner wall 18 of the inner wheel 7. In this design, the cover is likewise of eccentric design corresponding to the overall eccentricity formed by the eccentric cam parts 30, 32. The square hole 45 for attachment to a drive is evident in the interior of the bearing journal 42.

When the bearing journal 42 is actuated, the overall eccentricity is reduced by means of the carrier plate 34, which moves the eccentric cam parts 30, 32 relative to one another, so that the eccentric cam formed drives the inner wheel 7 to circulate in the ring gear 5. Since the inner wheel 7 is attached to the seat adapter 8 in a stationary manner, the result is a rotation of the backrest adapter 6, and the backrest of the vehicle seat attached thereto, in the same direction as the bearing journal 42.

Figure 3:
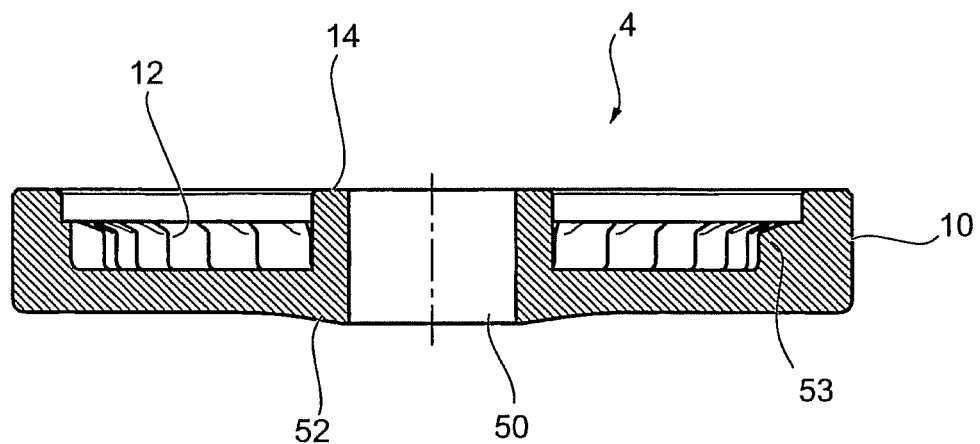
FIG. 3 is a cross-sectional view of an outer wheel produced by cold extrusion.

FIG. 3 shows a cross-section of an outer wheel 4 fabricated by cold extrusion. Visible are the elongated collar 14 surrounding a central bore 50, and the raised outer wall 10 on whose inner circumference the internal teeth 12 are formed. By means of cold extrusion, the material thickness of the outer wheel 4 is increased in the region 52 toward the elongated collar 14 and in the tooth region 53. In this regard, the outer wheel 4 fabricated by cold extrusion has a distribution of material appropriate to loading.

Figure 4:
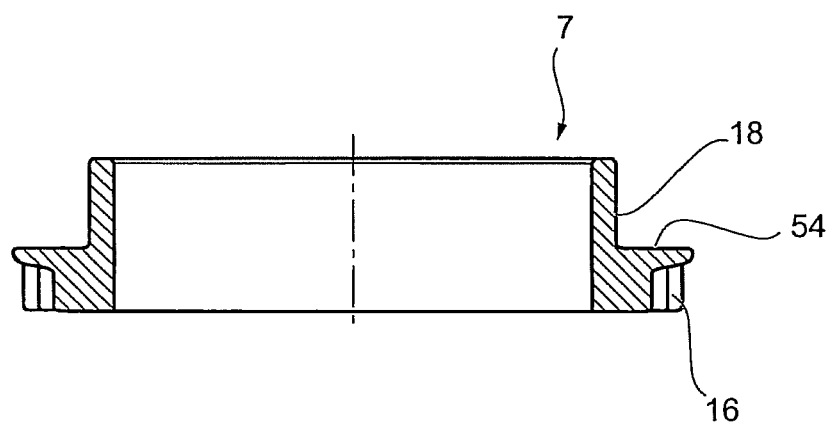
FIG. 4 is a cross-sectional view of an inner wheel produced by cold extrusion.

FIG. 4 shows a cross-section of a cold-extruded inner wheel 7. The raised inner wall 18, which carries external teeth 16 on its outer side, is evident. The external teeth 16 are circumferentially attached to a support geometry through a ring 54 located thereon. The strength of the inner wheel 7 is thus increased for the same assembled volume. Moreover, provision of the ring 54 achieves good material flow for forming of the external teeth 16 during cold extrusion.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adjustment fitting for a motor vehicle seat, the adjustment fitting comprising:
    a first fitting part;
    a second fitting part that is rotationally adjustable relative to the first fitting part about an axis of rotation;
    an outer wheel associated with the first fitting part, the outer wheel having internal teeth, the outer wheel being configured as a ring gear with a floor and an outer wall that is extended in an axial direction past the internal teeth;
    an inner wheel inserted in the outer wheel eccentrically to the axis of rotation in the manner of a wobble mechanism, the inner wheel having external teeth that are associated with the second fitting part, the inner wheel forming a receiving space that is eccentric to the axis of rotation;
    an eccentric cam rotatably inserted in the eccentric receiving space;
    a drive shaft configured to drive the eccentric cam; and
    a retaining element attached to the outer wall and supporting the inner wheel against the floor of the ring gear,
    wherein the retaining element is separable from the second fitting part.

2. The adjustment fitting according to claim 1, wherein the inner wheel is supported on the retaining element by the external teeth.

3. The adjustment fitting according to claim 1, wherein the inner wheel includes an inner wall that is extended in the axial direction past the external teeth and that passes through the retaining element in the axial direction, and wherein the inner wheel is associated with the second fitting part via the inner wall.

4. The adjustment fitting according to claim 1, wherein the outer wall of the ring gear and the inner wall of the inner wheel are each designed as a cylinder wall.

5. The adjustment fitting according to claim 1, wherein the retaining element is designed as a retaining ring.

6. The adjustment fitting according to claim 1, wherein an elongated collar is formed on the floor of the ring gear so that the eccentric receiving space is formed between the elongated collar and the inner wheel.

7. The adjustment fitting according to claim 1, wherein the eccentric cam in the eccentric receiving space is supported between an inner plain bushing and an outer plain bushing.

8. The adjustment fitting according to claim 1, wherein two mutually rotatable eccentric cam parts forming a variable overall eccentricity are placed in the receiving space and are preloaded against one another to form a maximum overall eccentricity, and wherein a carrier that is attached to the drive shaft in a rotationally fixed manner is provided which acts on the eccentric cam parts in opposition to the preloading when driven.

9. The adjustment fitting according to claim 1, wherein the retaining element is welded to the outer wall of the ring gear.

10. The adjustment fitting according to claim 1, wherein the drive shaft is designed as a continuous bearing journal.

11. The adjustment fitting according to claim 1, wherein the first fitting part or the ring gear is attached or welded to a backrest adapter, and wherein the second fitting part or the inner wheel is attached or welded to a seat adapter.

12. The adjustment fitting according to claim 1, wherein the external teeth of an inner wall of the inner wheel are covered by a circumferential ring.

13. The adjustment fitting according to claim 1, wherein the complete inner wheel, with inner wall and all external teeth are fabricated as a cold extrusion part.

14. The adjustment fitting according to claim 1, wherein the outer wheel is fabricated as a cold extrusion part.

15. An adjustment fitting for a motor vehicle seat, the adjustment fitting comprising:
 a first fitting part including an outer wheel having internal teeth, the outer wheel being configured as a ring gear with a floor and an outer wall that is extended in an axial direction past the internal teeth;
 a second fitting part that is rotationally adjustable relative to the first fitting part about an axis of rotation, said second fitting part including an inner wheel inserted in the outer wheel eccentrically to the axis of rotation in the manner of a wobble mechanism, the inner wheel having external teeth and the inner wheel forming a receiving space that is eccentric to the axis of rotation;
 an eccentric cam rotatably inserted in the eccentric receiving space;
 a drive shaft configured to drive the eccentric cam; and
 a retaining element attached to the outer wall and supporting the inner wheel against the floor of the ring gear,
 wherein the retaining element is separable from the second fitting part.

16. The adjustment fitting according to claim 15, wherein the second fitting part further comprises a seat adapter plate, and
 wherein the retaining element is disposed between the inner wheel and the seat adapter plate.

17. The adjustment fitting according to claim 15, wherein the inner wheel comprises a protruding inner wall portion, and
 wherein the retaining element is a retaining ring and is positioned around the protruding inner wall portion.

18. An adjustment fitting for a motor vehicle seat, the adjustment fitting comprising:
 a first fitting part including an outer wheel having internal teeth, the outer wheel being configured as a ring gear with a floor and an outer wall that is extended in an axial direction past the internal teeth;
 a second fitting part that is rotationally adjustable relative to the first fitting part about an axis of rotation, said second fitting part including an inner wheel inserted in the outer wheel eccentrically to the axis of rotation in the manner of a wobble mechanism, the inner wheel having external teeth and the inner wheel forming a receiving space that is eccentric to the axis of rotation;
 an eccentric cam rotatably inserted in the eccentric receiving space:
 a drive shaft configured to drive the eccentric cam; and
 a retaining element positioned to define axial play of the inner wheel and the retaining element being attached to the outer wall and supporting the inner wheel against the floor of the ring gear,
 wherein the retaining element is welded to the outer wall of the ring gear.

19. An adjustment fitting for a motor vehicle seat, the adjustment fitting comprising:
 a first fitting part;
 a second fitting part that is rotationally adjustable relative to the first fitting part about an axis of rotation,
 an outer wheel associated with the first fitting part, the outer wheel having internal teeth, the outer wheel being configured as a ring gear with a floor and an outer wall that is extended in an axial direction past the internal teeth;
 an inner wheel inserted in the outer wheel eccentrically to the axis of rotation in the manner of a wobble mechanism, the inner wheel having external teeth that are associated with the second fitting part, the inner wheel forming a receiving space that is eccentric to the axis of rotation;
 an eccentric cam rotatably inserted in the eccentric receiving space;
 a drive shaft configured to drive the eccentric cam; and
 a retaining element being welded to the outer wall of the ring gear and supporting the inner wheel against the floor of the ring gear.

* * * * *